United States Patent [19]
Womach et al.

[11] Patent Number: 5,278,662
[45] Date of Patent: Jan. 11, 1994

[54] PERSONAL CUSTOM VIDEO RECORDING AND THE PROCESS AND APPARATUS FOR MAKING SAME

[75] Inventors: Merrill P. Womach; Daniel P. Womach; Keith C. Schultz, all of Spokane, Wash.

[73] Assignee: National Music Service Incorporated, Spokane, Wash.

[21] Appl. No.: 50,759

[22] Filed: Apr. 20, 1993

Related U.S. Application Data

[63] Continuation of Ser. No. 520,251, May 7, 1990, abandoned.

[51] Int. Cl.⁵ .............................................. H04N 5/782
[52] U.S. Cl. ..................................... 358/335; 358/185; 360/33.1; 360/13
[58] Field of Search ............... 358/335, 342, 310, 311, 358/319, 346; 360/55, 13, 33.1, 72.1, 14.1

[56] References Cited

U.S. PATENT DOCUMENTS

| | | | |
|---|---|---|---|
| 4,528,600 | 7/1985 | Ishiguro et al. | 360/72.1 |
| 4,672,481 | 6/1987 | Zieger et al. | 358/335 |
| 4,688,105 | 8/1987 | Bloch et al. | 358/335 |
| 4,789,907 | 12/1988 | Fischetti et al. | 358/335 |
| 4,965,673 | 10/1990 | Bozzo et al. | 358/335 |
| 5,038,220 | 8/1991 | Eguchi | 358/310 |

Primary Examiner—Tommy P. Chin
Assistant Examiner—Khoi Truong
Attorney, Agent, or Firm—Wells, St. John, Roberts, Gregory & Matkin

[57] ABSTRACT

A personal customized video recording 10 is described along with the process and apparatus for producing such a recording. The recording has the desired length which includes a desired sequence of personal image segments 34 that are taken from a series of still photographs 12 of a featured person. A personal image video tape 14 is produced which is utilized in conjunction with a scenic image video storage medium or tape 16. Additionally a prerecorded audio musical storage medium or tape 18 is utilized. All three of the mediums 14, 16, and 18 are placed in recorders and operated in real time continuously and without interruption to produce a composite master video recording of the desired length. A vast majority of the scenic images are interleaved between the personal images. A majority of the personal images and a majority of the scenic images appear to have movement utilizing zoom/panning techniques.

48 Claims, 7 Drawing Sheets

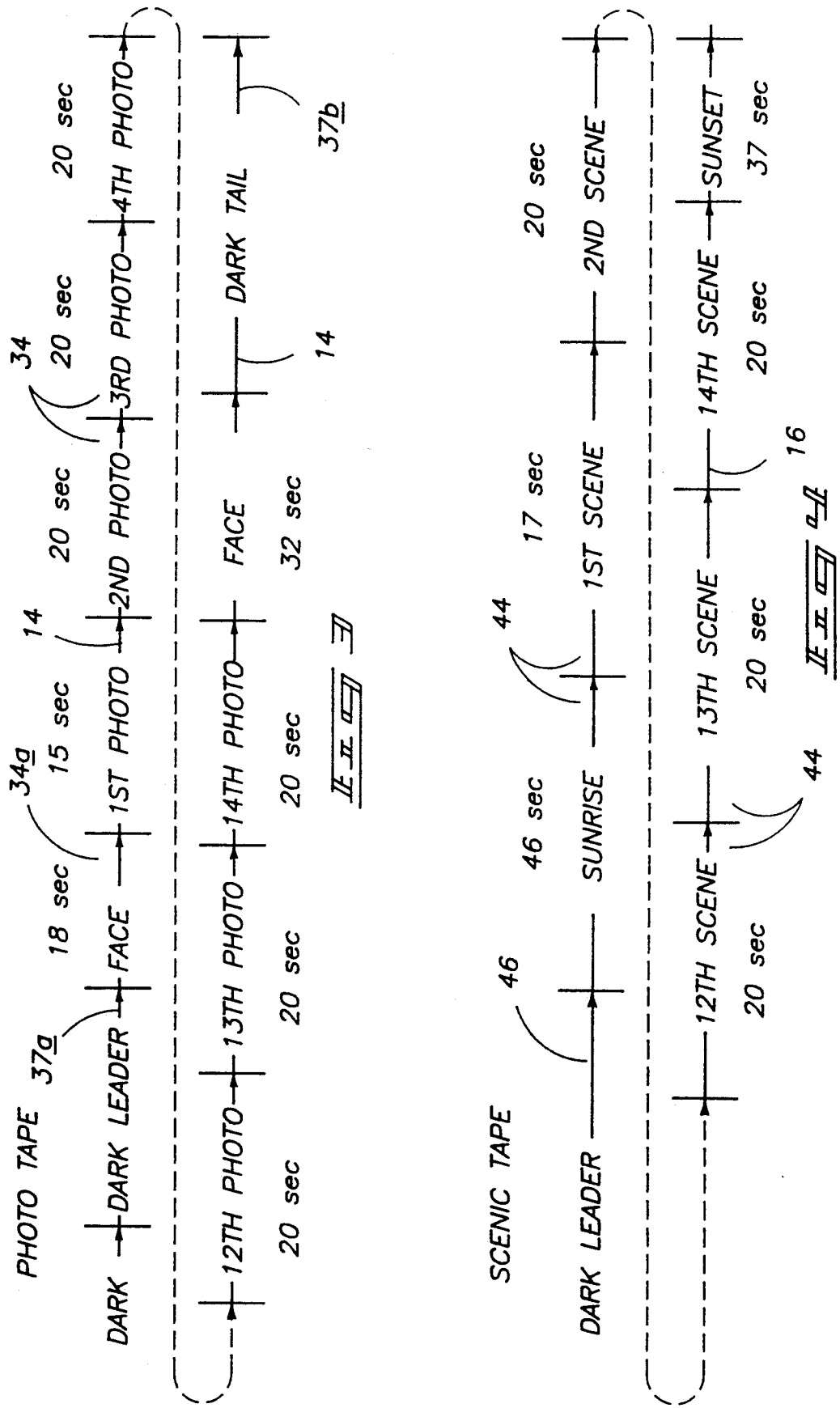

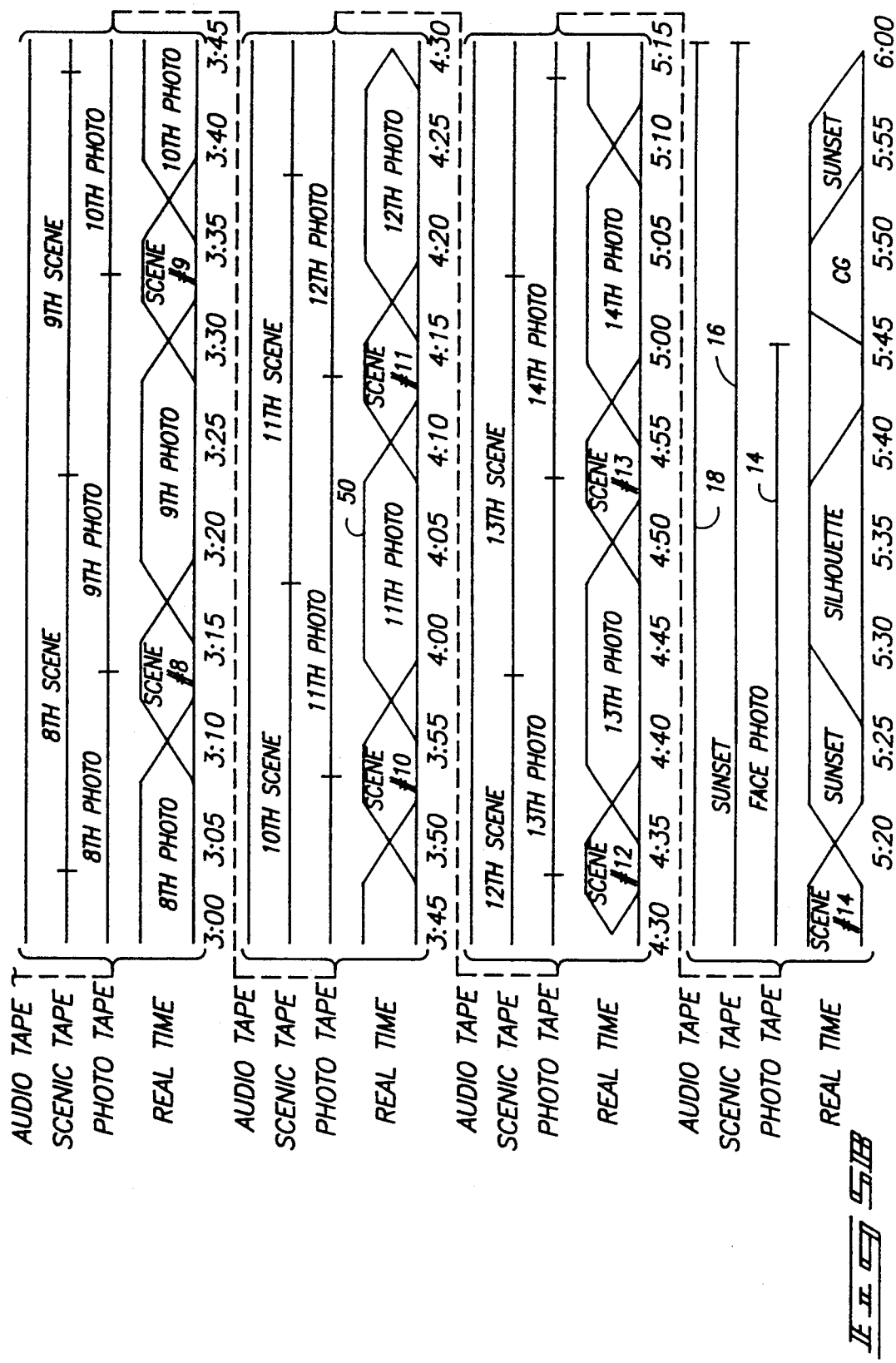

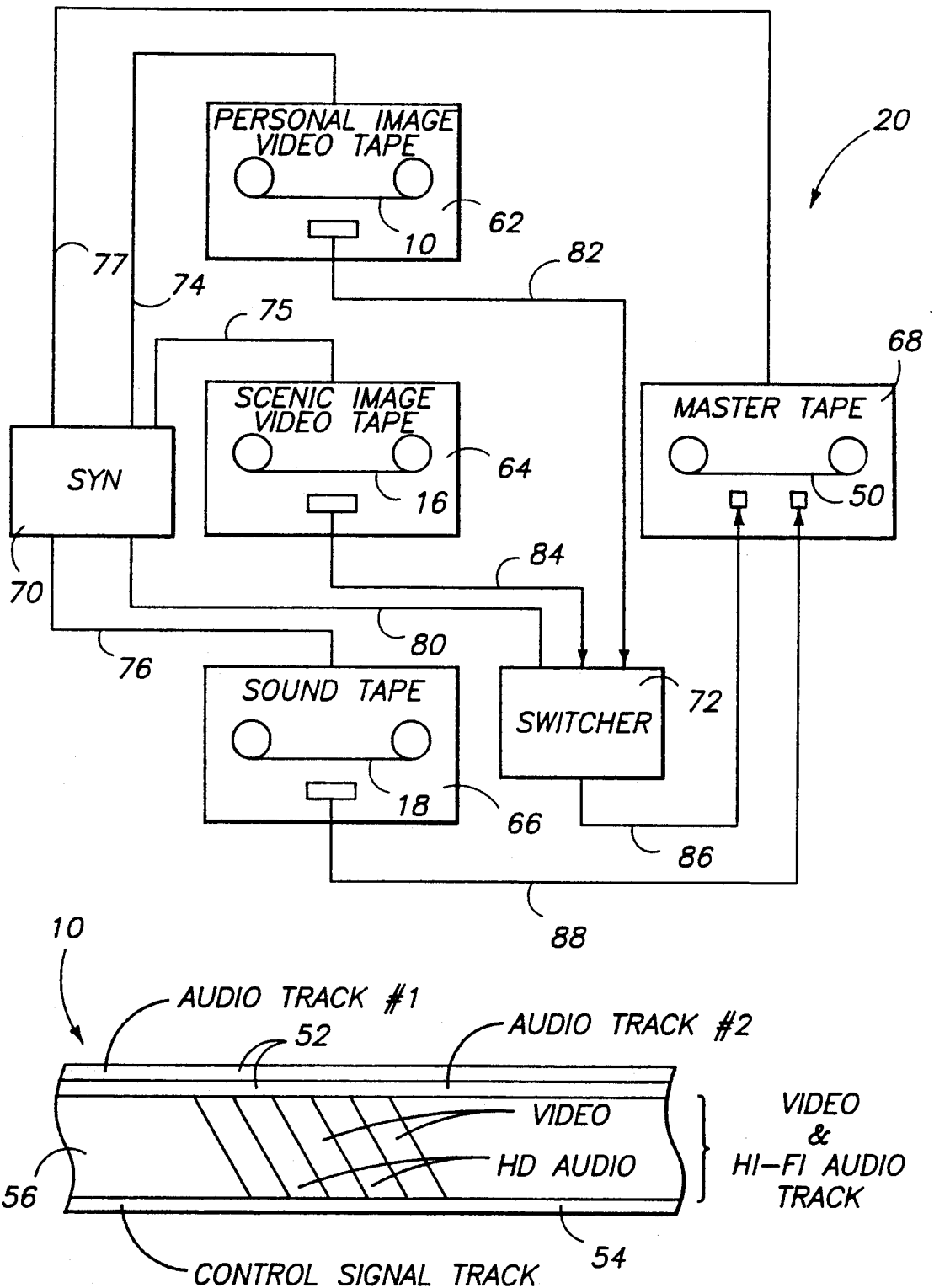

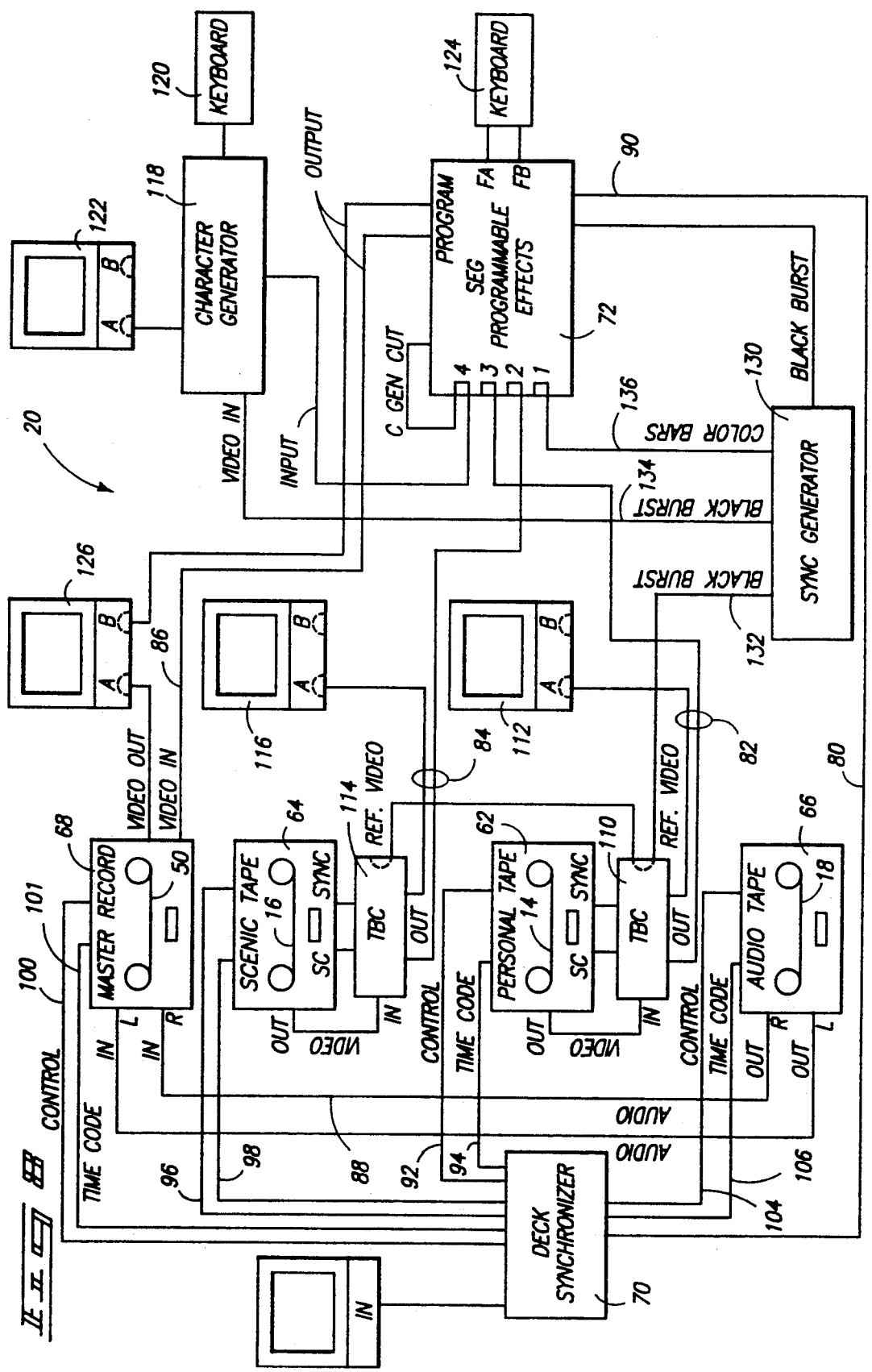

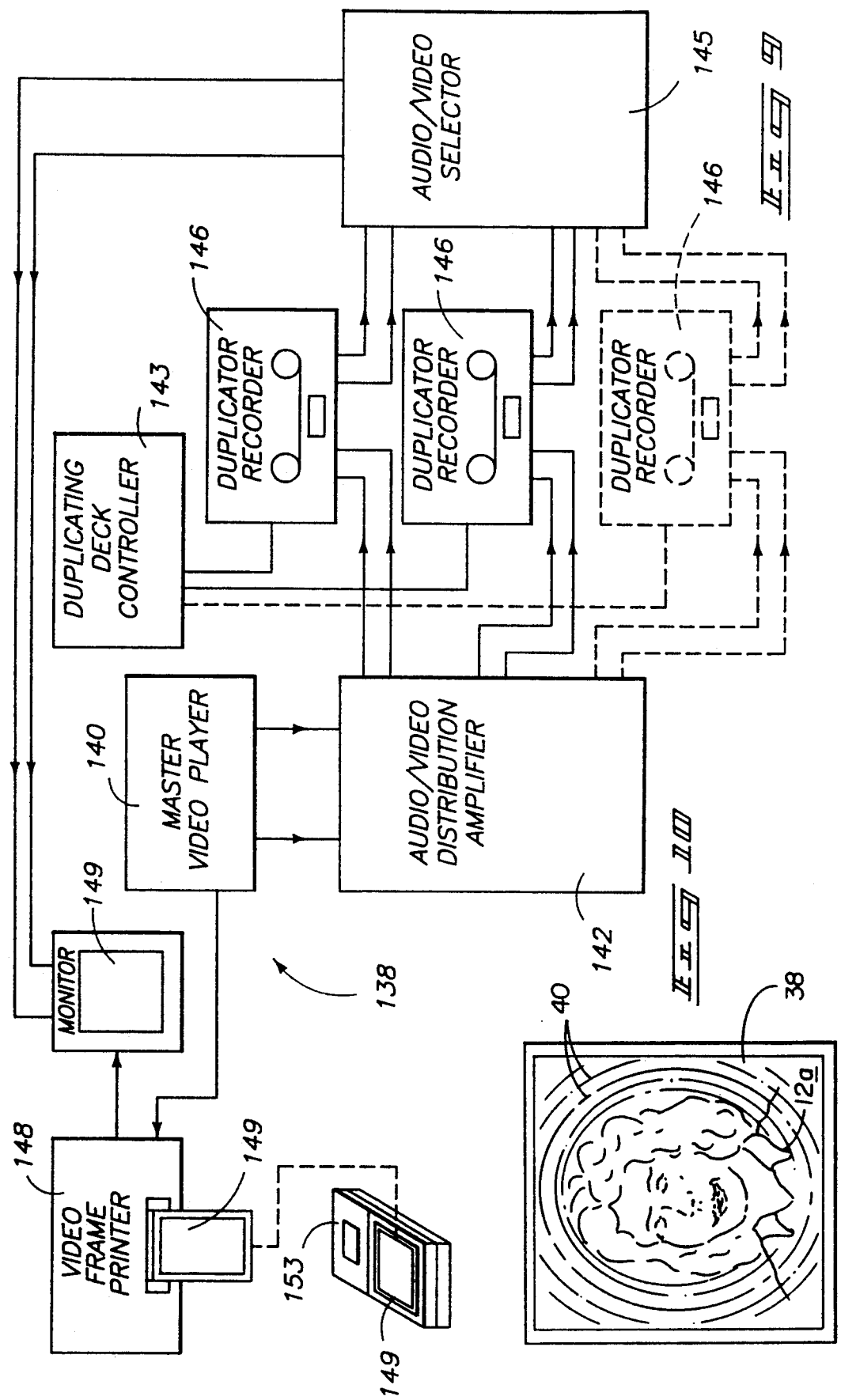

PERSONAL CUSTOM VIDEO RECORDING AND THE PROCESS AND APPARATUS FOR MAKING SAME

This is a continuation of application Ser. No. 07/520,251, filed on May 07, 1990.

TECHNICAL FIELD

This invention relates to personal custom video recordings and the apparatus and process for producing same.

BACKGROUND OF THE INVENTION

Previous to the applicant's invention, it was common to make personalized custom video recordings utilizing a match frame editing technique from a series of still photographs of a featured person. Such technique generally involved recording each photograph on a first video tape at successive equal length increments, such as one minute increments. A second video tape generally included a series of scenes that were sequentially recorded at one minute intervals. The photographic tape and the scene tape then were placed in respective video players and controlled by an editor in which the photographic tape and the background tape, along with the master recording tape were repeatedly stopped at each edit point with the selected tape being shuttled either fast forward or fast reverse to its desired location. Then the three tapes would be prerolled backward a desired increment and then restarted forward for a certain time to accomplish the next visual effect in switching from one tape image to the other tape image. This continual sequence of (1) stopping, (2) shuttling, and (3) implementing the preroll at each edit point is rather time consuming. For example, each shuttle and preroll time consumes a minimum of approximately 16 seconds. It would not be unusual for several prerolls to abort requiring additional starts which would delay the production for an additional 35 seconds each time the preroll is aborted. Consequently the time to produce a six-minute personal custom video recording, utilizing the matched frame editing technique would easily consume well over 10 minutes and more likely require 20 and 30 minutes. Normally it is desirable to then record background music onto the video recording which further extends the production time. Although such a lengthy production time may be acceptable when relatively few personal customized video recordings are being made, such a process is rather time consuming and expensive. Such a process only lends itself to produce personal custom video recordings for those persons having substantial financial resources. It is generally not applicable to providing quality, professional customized video recording for persons of moderate financial resources.

The applicant has devised a real time system for producing a customized video recording of a prescribed length of time in which the time required for producing the recording is the same as the length of the custom recording. Consequently for a six-minute personal customized video recording, applicant is able to produce the recording in six minutes.

This is particularly important in being able to provide low cost yet personal, professionally customized video recordings for persons of moderate means on a large volume basis. Utilizing the prior art match frame editing technique it would be very unusual to produce one or two six-minute recordings within an hour. However, utilizing the applicant's invention, one is able to produce between five and eight six-minute personal customized recordings each hour. Such efficiency enables one to produce recordings, even though they are customized, at a very reasonable price to the public. For example, applicant is able to produce such personal customized video recordings within a price range that is affordable to almost all persons who have a video cassette player. Consequently the average person can have a personal customized video recording produced for a celebration or ceremony such as a birthday, an anniversary or a funeral.

Other objects and advantages of this invention will become more apparent upon reading the following detailed description of a preferred embodiment.

BRIEF DESCRIPTION OF THE DRAWINGS

A preferred and alternate embodiments of the invention are illustrated in the accompanying drawings, in which:

FIG. 3 is a time line schematic illustrating the sequential recording of personal images from the still photographs onto a personal image video tape;

FIG. 4 is a time line schematic illustrating the sequential recording of scenic images onto a scenic video tape;

FIGS. 5a-5b are composite time line schematic of sequential production of a master video recording in which the personal images, the scenic images and music are recorded onto the master video recording;

FIG. 6 is a block diagram of the basic components utilized in producing the master video recording from the personal image video tape, the scenic video tape and a musical audio tape;

FIG. 7 is an enlarged fragmentary schematic view of a segment of the master video tape illustrating the various tracks;

FIG. 8 is a more detailed schematic block diagram of the apparatus used to produce a personal custom video recording from the still photographs illustrated in FIG. 1;

FIG. 9 is a schematic block diagram of a duplicating subsystem apparatus for making duplicate recordings from a master and for producing a still video print for a video cassette jacket; and FIG. 10 is a pictorial view of a visual effect on the master showing a soft circle wipe about the face of the individual.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

Figure 5A:
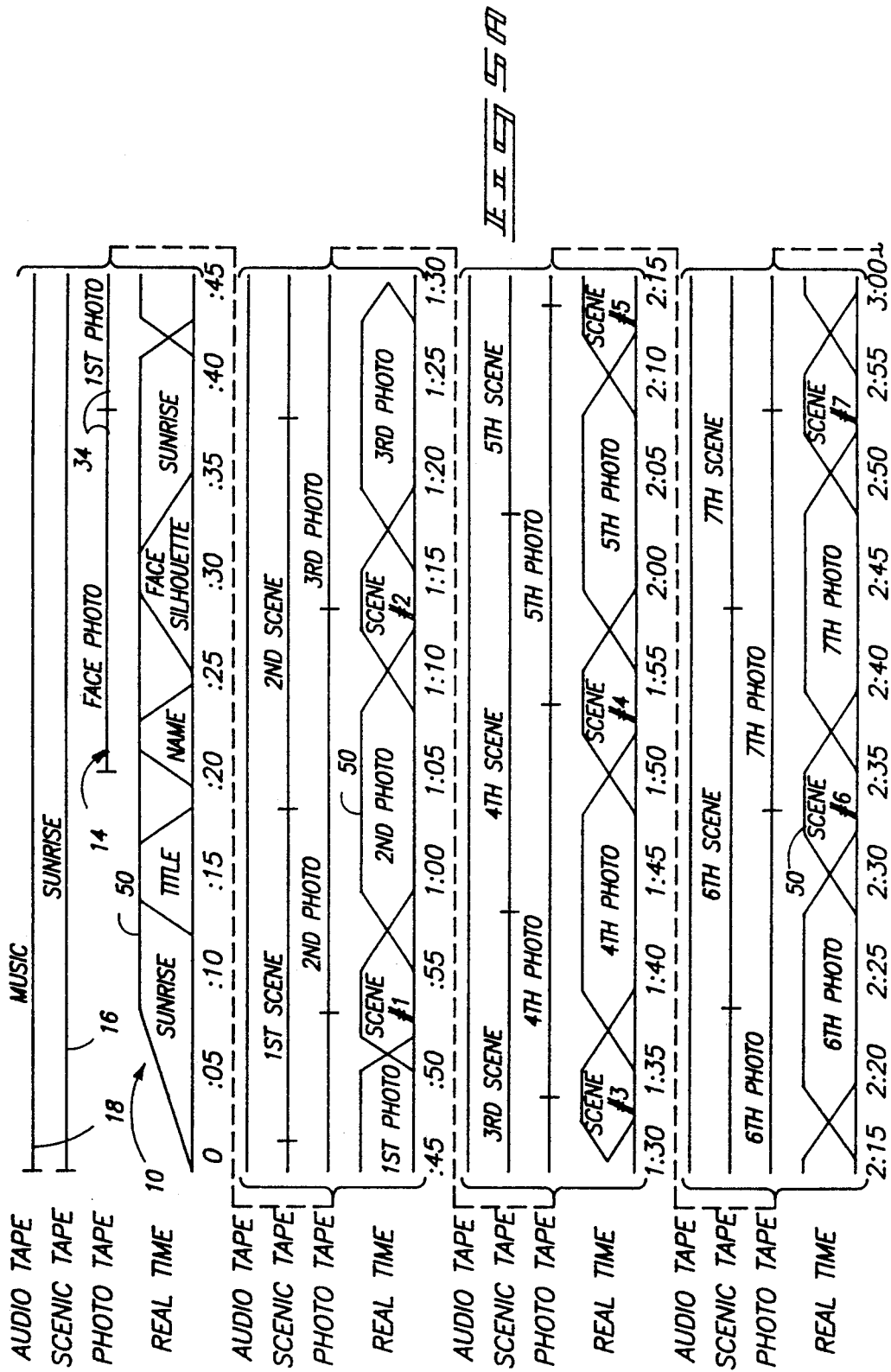

A preferred embodiment of a personal custom video recording, generally designated with the numeral 10, is shown in graphic form in FIGS. 5a-5b. A segment of the recording in the form of a tape is illustrated in FIG. 7. The personal recording 10 is generally displayed at special occasions such as birthdays, anniversaries and funeral memorials of a featured person. Although not preferred, a custom recording 10 could feature more than one person such as a family. The recording 10 is designed for a selected length. For the purpose of explanation, the preferred embodiment will be described in relation to a memorial custom video recording 10 of a selected length of six minutes which features and celebrates the life of the deceased person.

The personal custom video recording 10 is personalized utilizing a series of still photographic images 12(a)-(o) of the featured person. The still photographic images may be still positive slides or still negative prints. In the preferred embodiment, at least one of the photographic images 12 is a face portrait 12(a). Additionally, preferably at least one of the still photographic images includes a group of individuals in which the featured person is included within the group.

Figure 1:
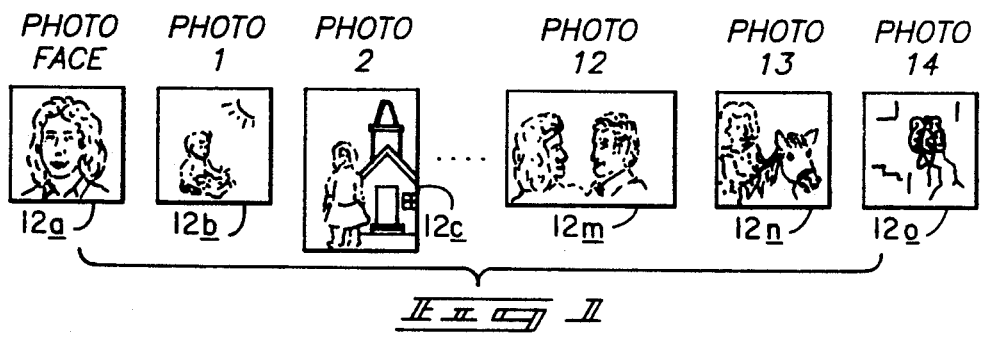
FIG. 1 is a series of still photographs of a person.
Figure 2:
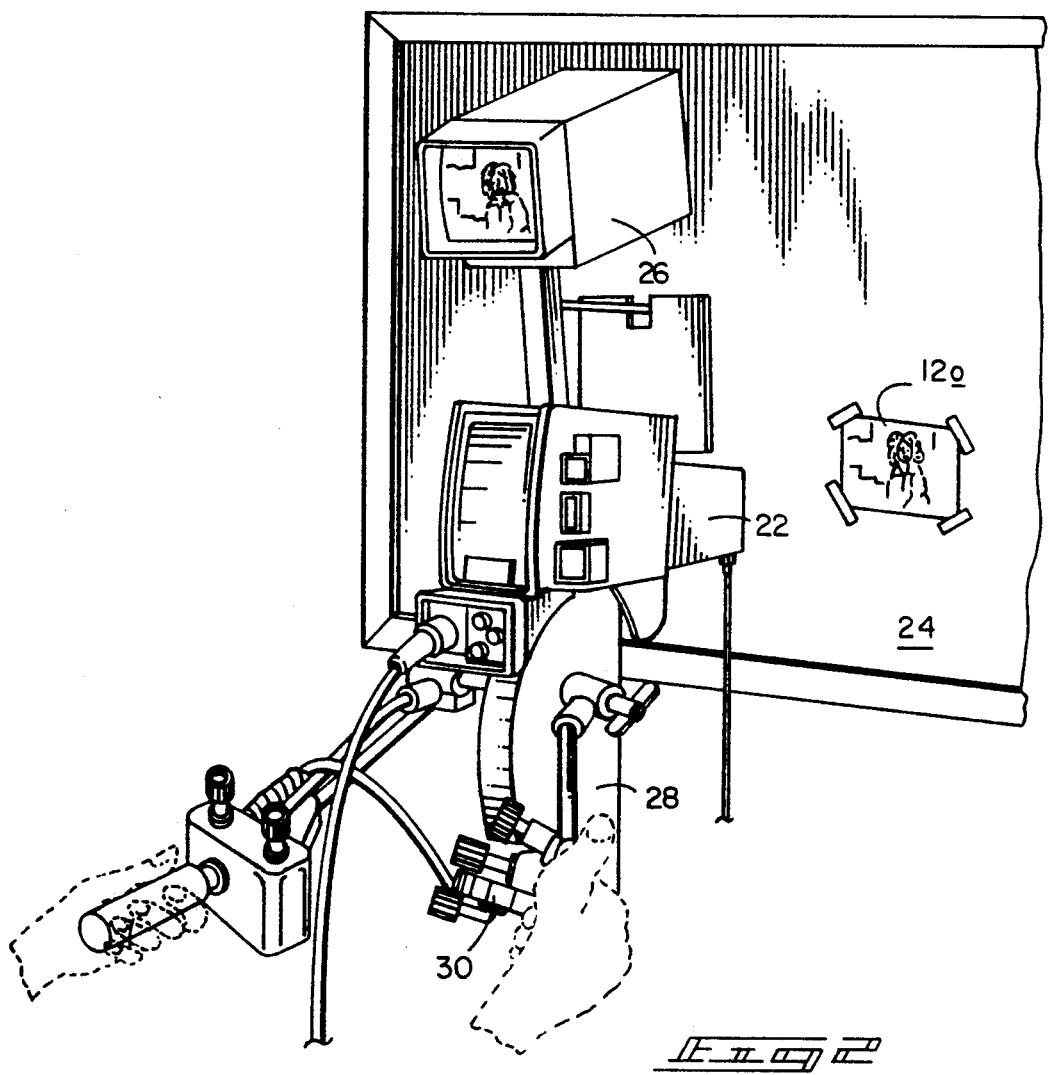
FIG. 2 is an isometric view of video camera assembly shown recording a personal image from one of the still photographs illustrated in FIG. 1.

As illustrated in FIGS. 1-3, the still Photographs 12(a)-12(o) are utilized in producing a personal image video recording on a storage medium 14, preferably a magnetic cassette video tape, in the same sequence in which the still photographs are selected for presentation.

Additionally scenic images are recorded onto a video storage medium 16, preferably a magnetic video cassette tape from a series of scenic images. In the preferred embodiment the scenes are seasonally sequenced from natural scenes which have a spring-like theme to those that have a winter-like theme.

Further, a prerecorded audio music storage medium 18, preferably an audio tape, is utilized that includes prerecorded music with a desired vocal (song) segment. From each of the mediums 14, 16 and 18, the personal custom video recording 10 is produced to form a composite master recording 50 with a majority of the scenic images interleaved between the personal images with the prerecorded music serving as a third component on the recording 10.

The personal custom video recording 10 is produced utilizing a customizing video recording apparatus 20, that includes a video camera 22, illustrated in FIG. 2, for producing personal images on a video storage medium 14 from the still photographs 12(a)-12(o). The video camera is positioned in front of a photograph mounting board 24. The video camera 22 has a monitor 26 for assisting the camera person in manipulating the camera 22 with respect to the mounting board 24. The still photographs 12 are sequentially placed on the board 24 in a selected sequence. The camera 22 includes a fluid head 28 having horizontal and vertical panning and a zoom control 30.

The video camera 22 is utilized for placing personal image frame segments 34, of a specific time length and in the desired sequence, on the video storage medium 14 from the series of still photographs 12(a)-12(o). Preferably a majority of the frame segments 34 are of the same length. In the example, a majority of the frame segments 34 are of a 20 second length as illustrated in FIGS. 3 and 5. Each of the frame segments 34 include personal images taken from a corresponding still photograph 12(a)-12(o). Preferably a majority of the personal images appear to have movement. The appearance of movement is created by panning the photograph and/or zooming the photograph to effectively enlarge or contract the personal image with respect to the still photograph 12. In the preferred embodiment, all but the first and last personal image segment 34 present the person in apparent movement utilizing the panning controls and a zoom control 30.

The video storage medium 14, preferably includes a recorded dark beginning leader 37(a) and a dark blank ending leader 37(b) in which the entire length of the medium 14 is equal to or slightly greater than six minutes. In FIG. 3 it should be noted that the personal image video storage medium 14 includes a majority of personal image frame segments 34 having the same time increment of 20 seconds.

In the preferred embodiment, the first still photograph 12(a), which is a face portrait, is utilized to form a silhouette personal image 38 (FIGS. 5a-5b and 10) of the person near the beginning and near the end of the recording. The silhouette personal image 38 is created utilizing special effects of a soft circle wipe 40 about the face of the individual in which the soft circle wipe 40 does not appear to have any beginning or ending boundary.

The scenic image video storage medium 16, preferably a video cassette tape, has a series of frame segments 44 that includes a series of scenic views that are formatted in a selected sequence. The frame segments 44 are produced by a video camera very similar to video camera 22. Preferably, at least one of the frame segments 44 includes a scene that includes moving objects such as a stream, waterfall or wave motion on a beach. Furthermore, use of video camera panning and zooming is utilized to give at least a majority of the scenic frame segments 44 the appearance of movement. The scenic image video storage medium 16 preferably has a dark beginning leader 46. Preferably, the storage medium 16 includes scenic image frame segments 44 of a sunrise image and of a sunset image. It should be noted that most of the frame segments 44 have a time increment of 20 seconds corresponding to the majority time length of the personal image frame segments 34. Both the sunrise segment 44 and the sunset segment 44 include a soft circle wipe 40 insert that is utilized in conjunction with the face personal image segment 34(a) to form a composite silhouette image 38 (FIG. 10) near the beginning and end of the video recording 10.

Preferably the custom video recording medium 50 is formed of a commercially available video tape, referred to as "SVHS", that has normal audio tracks 52 (FIGS. 5a-5b) along one edge and a control track 54 along an opposite edge with a combined video and high fidelity audio track 56 formed intermediate the audio tracks 52 and the control tracks 54.

Apparatus for Making Personal Custom Video Recording

The apparatus 20 is operated, utilizing the personal image video storage medium 14, the scenic video storage medium 16 and the prerecorded audio music storage medium 18 as inputs, to produce a master custom video recording 50 having master frame segments that have the same sequence of personal images as provided on the storage medium 14 and the same sequence of scenic images as provided on storage medium 16.

As illustrated in FIGS. 6 and 8, the recording apparatus 20 includes a personal image video tape player or deck 62 for receiving the personal image video storage medium 14. The apparatus 20 further includes a scenic image tape video player or deck 64 for receiving the scenic image video storage medium 16. A music tape video player or deck 66 is provided to receive the prerecorded audio music storage medium 18. The apparatus 20 includes a master recorder 68 for receiving a blank master custom video recording medium 50 from which the personal custom video recording 10 is duplicated.

The apparatus 20 includes a synchronization controller 70 that is connected through synchronization control cables 74-77 to the video players 62, 64, 66 and recorder 68 respectively. The controller 70 synchronizes each of the players and master recorder to operate continuously without interruption during the six-minute recording period in a selected time shifted or time staggered relationship. Each of the video storage means 14, 16 and 60 have been previously formatted with the SMPTE time code utilizing 29 frames per second (non-drop frame). Consequently the synchronization controller 70 can synchronize the players 62 and 64 in a very precise time shifted manner.

The recording apparatus 20 further includes a programmed switcher 72 that receives the video outputs from the personal image tape player 62 and the scenic image tape player 64 and then switches between the personal video storage medium 14 and the scenic image video storage medium 16 according to a preselected sequential program to produce the master recording 50. The synchronization controller 70 and the preprogrammed switcher 72 are interconnected by an interface cable 80 so that the switcher initiates the sequential program in time synchronization with the operation of the players 62 and 64. The personal image signal from the tape player 62 is input to the switcher 72 through a video input line 82. The video signal from the scenic image tape player 64 is input to the switcher 72 via the video input line 84. An output video line 86 extends from the switcher 72 to the master recorder 68. Video input lines 88 from the musical tape player 66 are input directly to the master recorder 68.

More particularly, the synchronization control cable 74 includes a signal control line 92 and a timing code line 94 that extend between the controller 70 and the personal image video tape player 62. Cable 75 carries the signal control 96 and the time code line 98 between the scenic image tape player 64 and the controller 70. Likewise cable 77 carries the signal control line 100 and the time code line 101 between the controller and the master recorder 68. The video synchronization cable 76 includes a signal control line 104 and a timed code line 106 that extends between the controller 70 and the music tape video player 66. The output video line 82 passes through a time base corrector 110 to synchronize the system color code. Additionally a monitor 112 is operatively connected to the video input line 82 from the player 62 to display the output from the personal image tape player 62 as the player is being operated so that the operator of the apparatus 20 can visually monitor the output from the personal image player 62. Likewise, the video input line 84 interconnects to a time base corrector 114 and to a video monitor 116 to enable the operator to visually monitor the output from the scenic image player 64.

The apparatus further includes a character generator 118 (FIG. 8) that has a keyboard 120 for enabling the operator to "type in" or generate alphabetic characters to formulate a "title" segment to be inserted adjacent the forward end of the master recording. Generally the character generator 118 is instructed to display the name of the featured person and the birthday of the person. In the preferred example, the character generator may create a title segment such as "In Celebration of the Life of John Doe: Born Aug. 14, 1917". A character generator monitor 122 is attached to the character generator 118 to display to the operator the title segment to be inserted on the master recording.

The switcher 72 further includes a keyboard 124 to enable the operator or programmer to insert the preset sequential switching program into memory of the switcher 72 prior to recording on the master so that the switcher 72 when activated will automatically perform the programed steps to produce the master recording simultaneously (real time) with the continuous and uninterrupted playing of the personal image tape 14 and the scenic image tape 16. The video output cable 86 extends from the switcher 72 to the master recorder 68. A monitor 126 is associated with the master recorder 68 to display the video signal being recorded on the master recorder 50.

The apparatus further includes a color synchronization generator 130 for synchronizing the color standardization of the video components. A black burst line 132 extends from the synchronization generator 130 to the time base correctors 110 and 114 to control the color format of the output signal from the players 62 and 64. Likewise a black burst line 134 extends from the color synchronization generator 130 to the character generator 118. Additionally a color bar signal line 136 extends from the color synchronization generator 130 to the switcher 72 for aligning the system timing.

The synchronization controller 70 controls the players 62 and 64 so that the frame segments 34 of the personal images are time shifted with respect to the scenic frame segments 44 with at least a majority of the frame segments 44 time shifted to equally overlapping two adjacent personal image frame segments 34 as illustrated in FIGS. 3, 4 and 5. For example, one scenic frame segment 44 of 20 seconds time overlaps two adjacent personal image segments 34 with the overlap being 10 seconds of each segment 34.

Preferably, the recording apparatus 20 includes a duplicating subassembly 138 that is illustrated in block diagram in FIG. 9. The duplicating subassembly 138 includes a master video player 140 for playing the finished master recording 50. One or more duplicator recorders 146 are connected to the output of the master player 140 to produce one or more duplicates of the master recording. Additionally the duplicating subassembly 138 includes a video frame color printer 148 for generating a video color print 149 of the featured person to be placed in a compartment of a video cassette jacket 153 containing the custom video recording 10. The video color printer 148 is activated to freeze the silhouette of the person and then print the silhouette on thermal paper. The audio/video signal from the master video player 140 is amplified and distributed to the duplicator recorders 146 by an audio/video distributor amplifier 142. A deck controller 143 synchronizes and controls the decks 146. A selector 145 selects the output signal sent to a monitor 149.

Process for Making Personal Custom Video Recording

In the preferred embodiment, the master recording 50 is produced in accordance with a preselected sequential program. The preferred embodiment of the process in producing the master recording is illustrated in FIGS. 5a-5b.

Initially the photographs are put in chronological order and then numbered. The best face photo of the person (one that the majority of the people who knew the person would recognize) is generally used for the first and last personal image segment 34 and no panning or zooming is utilized to produce simulated movement. The personal image segments 34 are sequentially made from the photographs 12(a)-12(o) with the vast majority of the frame segments 34 being of the same length, such as 20 seconds. Preferably, all of the personal images except for the first and last photograph are formed using panning or zooming techniques to give the personal images of the person a sense of movement. As previously mentioned, a dark blank beginning leader 37(a) and a dark blank ending leader 37(b) are placed on the personal image video recording 14. In the preferred embodiment, the completed personal image tape 14 has a length of six minutes.

The first sequence in producing the scenic image tape 16 is to progressively fade from a black image to a sunrise image segment 44 in approximately eight seconds. The sunrise image is held for 46 seconds. The first scenic image segment 44 is recorded for a length of approximately seventeen seconds. The next twelve scenic frame segments 44 follow in a sequence each having a segment length of approximately 20 seconds each. The last scenic segment 44 is that of a sunset image having a segment length of approximately 37 seconds. The sunset image segment then fades into a black segment. The scenic tape 16 has a length of six minutes or longer.

The prerecorded audio music storage medium 18 preferably includes background instrumental music with an interposed song or vocal segment. Preferably the vocal segment is timed to fade in when the preselected sequential program of the switcher 72 reaches the first photo image segment 34(a) of the deceased person. Preferably the song is selected by the deceased's family as being relevant to the deceased person's life. When the vocal ends, the instrumental background music fades back in. The audio tape 18 has a length of six minutes or more.

As previously mentioned, the master recording 50 preferably has a six-minute length and is made in real time with the continuous, interrupted playing of the personal image tape 14, the scenic tape 16 and the audio tape 18. The video synchronization controller 70 and the switcher 72 are used to fade and dissolve between the personal image tape 14 and the scenic tape 16 without stopping, shuttling or prerolling at each editing location. At the beginning and at the end of the master recording 50, a special video recording effect is utilized with the first and last face frame segments 34. The still face segments 34 are superimposed in the sunrise and sunset segments utilizing a soft circular wipe circumscribing the face image to form the soft silhouette 38 (FIG. 10). In addition, the character generator 118 may be utilized to write a phrase, a short poem, or a passage of religious scripture segment adjacent the end of the recording (FIGS. 5a-5b).

The following is a specific descriptive example of a selected sequential program for producing a master recording 50 of the preferred embodiment. The sequential program is illustrated in detail in FIGS. 5a-5b. Generally the switcher 72 records a dark leader at the very beginning of the recording. The switcher, at time zero, progressively fades in the scenic tape 16 having the sunrise segment at a fade rate of approximately eight seconds. After a four-second hold, the title segment from the character generator 118 is faded in at a fade rate of two seconds into the sunrise image. The title segment is held for two seconds and then faded out of the sunrise image at a two-second fade rate. After approximately one second, the name of the person and his/her birth date is faded into the sunrise image at a two-second fade rate and held for one second and then faded out of the sunset image in a two-second fade rate. Approximately one second later, the face image segment 34 from the tape 14 fades into the sunrise image superimposed within the soft circle wipe 40 to form the composite silhouette shown in FIG. 10. The face silhouette 38 holds for two seconds and then fades out of the sunrise image at a four-second fade rate. The sunrise image is held for an additional 4¼ seconds then is dissolved out at a two-second dissolve rate into the second photo image segment 34. The second photo image segment 34 is dissolved in approximately 7¼ seconds and then dissolved out into the second scenic image segment 44. The second scenic image segment 44 holds for approximately three seconds and then is dissolved to the third personal image segment 34 in an approximately four-second dissolve rate. The third photo image segment 34 holds for approximately nine seconds and then dissolves out in an approximately four-second dissolve rate. The third scenic image segment 44 is then dissolved in and held for approximately three seconds and then is dissolved out at a four-second dissolve rate. The next eleven personal image segments 34 and the next ten scenic image segments 44 are alternately dissolved in and out at an approximately four-second dissolve rate. The personal image segments are each held for nine seconds and the scenic segments are each held for approximately three seconds.

Stated in another way, the first photo segment 34 dissolves in and out at a two-second dissolve rate from the sunrise to the first scenic segment 44. The second through fourteenth photo segments 34 each dissolve in at a four-second dissolve rate and hold for nine seconds and then dissolve out at a four-second dissolve rate. The scenic image segments two through thirteen each dissolve in and out at a four-second dissolve rate and hold for three seconds. The fourteenth scenic image segment dissolves in and out in a four-second dissolve rate with the sunset dissolving in for approximately 37 seconds before dissolving out to a dark image tail. Intermediate the dissolving in and dissolving out of the sunset, the last still face segment 34 fades into the sunset image with an approximately four-second fade in rate and fade out rate. The silhouette image 38 is held for approximately seven seconds. After approximately three seconds, the ending scripture or phrase segment fades in in approximately two seconds and holds for three seconds before fading out in a four-second fade rate.

It should be noted that the personal image tape 14 and the scenic image tape 16 and the prerecorded music tape 18 are continually operated in conjunction with the video master recorder 68 to produce the video recording 50 continuously and without interruption for the entire six-minute period. The fade rate and the dissolve rate of the switcher 72 should preferably be between two and six seconds.

It should be further noted that the music is recorded not on the normal audio tracks 52 but is recorded on the high dynamic portion 56 of the video tape by using a video player 66, at the same time as the video recording so that there is no need for further audio recording or mixing of a musical audio track onto the master. It can be appreciated that such a process is particularly adopted for a high volume, mass production of personal custom video recordings which would otherwise be produced not in real time and not on a uninterrupted continuous basis.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A custom video recording process for producing a master custom video recording of a prescribed length of a featured person from a preselected number of still photographic images of the person, comprising the steps of:

recording personal images from the still graphic images onto a first video storage medium in a selected sequence, in which the personal images occupy adjacent frame segments of preselected lengths;

recording scenic images onto a second video storage medium in a selected recorded sequence, in which the scenic images occupy adjacent frame segments of preselected lengths;

subsequent to the recording of the personal images, placing the first video storage medium in a first video recording player;

placing the second video storage medium in a second video recording player;

placing a master custom video storage medium in a third recording player;

placing a prerecorded musical storage medium having selected music thereon in a music recording player;

operating the recording players continuously and without interruption and in synchronization with each other for the prescribed length to produce a master custom video recording of the prescribed length on the master video storage medium having the personal images, the scenic images, and the selected music recorded thereon in real time in which the personal images and the scenic images are interleaved with respect to each other and with the personal images and the scenic images being in their prescribed sequences; and wherein the continuous operation of the recording players are synchronized with respect to each other so that the adjacent frame segments of the personal images on the first recording medium are time shifted with respect to the adjacent frame time segments of the scenic images on the second recording medium as the master video recording is being produced so that the frame segments of the still photograph images and the scenic images are not time coherent.

2. The custom video recording process as defined in claim 1 wherein the production of the master video recording includes the steps of switching between the first video recording player and the second video recording player and controlling the switching according to a preselected time sequential program to interleave the scenic images with the personal images in the selected recording sequences while the recording players are being continuously operated.

3. The custom video recording process as defined in claim 2 wherein the switching is controlled to progressively dissolve between the first video recording player and the second video recording player to interleave the scenic images with the personal images according to the preselected time sequential program.

4. The custom video recording process as defined in claim 3 wherein the preselected time sequential program provides that a majority of the interleaved scenic images have time lengths less than the personal images recorded on the master video recording.

5. The custom video recording process as defined in claim 3 where the switching time to progressively dissolve between the first recording player and the second recording player is between two and six seconds.

6. The custom video recording process as defined in claim 1 wherein the production of the master video recording includes the steps of switching between the first video recording player and the second video recording player and controlling the switching according to a preselected time sequential program to interleave the scenic images with the personal images in the selected recording sequences while the recording players are being continuously operated.

7. The custom video recording process as defined in claim 6 wherein the switching is controlled to progressively dissolve between the first video recording player and the second video recording player to interleave the scenic images with the personal images according to the preselected time sequential program.

8. The custom video recording process as defined in claim 7 wherein the preselected time sequential program provides that a majority of the interleaved scenic images have time lengths less than the personal images recorded on the master video recording.

9. The custom video recording process as defined in claim 7 where the switching time to progressively dissolve between the first recording player and the second recording player is between two and six seconds.

10. The custom video recording process as defined in claim 1 wherein the recording of the personal images includes the steps of sequentially placing the still photographic images before a video camera and operating the video camera to record the personal images onto the first video storage medium with the personal images occupying adjacent segments in the selected recorded sequence.

11. The custom video recording process as defined in claim 10 further comprising the step of operating the video camera in such a manner as to give a majority of the personal images recorded on the first video storage medium the visual appearance of the person moving.

12. The custom video recording process as defined in claim 10 wherein at least one of the still photographic images includes a group of persons in which the person is included and wherein the video camera is operated in such a manner to record frames including the group of persons as well as frames of close-ups of the person within the same frame segment.

13. The custom video recording process as defined in claim 1 wherein the recording of the scenic images on the second video storage medium comprises sequentially directing a video camera at the scenic images in the preselected recorded sequence and operating the video camera to enlarge or contract the apparent size of objects within a majority of the scenic images to give such majority of scenic images the visual appearance of motion.

14. The custom video recording process as defined in claim 1 wherein at least one of the scenic images includes moving objects within the image.

15. The custom video recording process as defined in claim 1 further comprising the step of recording a title segment at a forward end of the master custom video recording that includes the person's name.

16. The custom video recording process as defined in claim 15 wherein the title segment additionally includes the date of birth of the person.

17. The custom video recording process as defined in claim 1 wherein the music includes a vocal segment on the prerecorded musical storage medium.

18. A custom video recording process for producing a master custom video recording of a prescribed length of an individual person from a preselected number of still photographic images on the individual, comprising the steps of:
- recording personal images from the still photographic images onto a first video storage medium in a selected recorded sequence in which the personal images occupy adjacent frame segments of preselected lengths;
- recording scenic images onto a second video storage medium in a selected recorded sequence in which the scenic images occupy adjacent frame segments of preselected lengths;
- subsequently to the recording of the personal images, placing the first video storage medium in a first video recording player;
- placing the second video storage medium in a second video recording player;
- placing a master custom video storage medium in a third recording player;
- placing a prerecorded musical storage medium having selected music thereon in a music recording player;
- operating the recording players continuously and without interruption and in synchronization with each other for the prescribed recording length;
- while operating the recording players continuously and without interruption, switching between the first video recording player and the second video recording player according to a preset sequential switching program and recording continuously and without interruption onto the master video recording medium for the prescribed length to produce the master custom video recording of the prescribed length having the personal images, the scenic images, and the selected music recorded thereon in real time in which the personal images and the scenic images are interleaved with respect to each other and with the personal images and the scenic images being in their prescribed sequences; and
- wherein the continuous operation of the recording players are synchronized with respect to each other so that the adjacent frame segments of the personal images on the first recording medium are time shifted with respect to the adjacent frame time segments of the scenic images on the second recording medium as the master video recording is being produced so that the frame segments of the personal images and the scenic images are not time coherent.

19. The custom video recording process as defined in claim 18 wherein the master video storage medium is a video magnetic tape having normal audio tracks and a video and high fidelity sound track and wherein the music player is a video player for recording the music on the video and high dynamic sound track, rather than on the normal audio tracks of the master video magnetic tapes.

20. The custom video recording process as defined in claim 18 wherein the first scenic image recorded on the master video storage medium includes an image of a sunrise.

21. The custom video recording process as defined in claim 18 wherein the last scenic image recorded on the master video storage medium includes an image of a sunset.

22. The custom video recording process as defined in claim 18 wherein the first personal image recorded on the master video storage medium includes a still facial photographic portrait of the person.

23. The custom video recording process as defined in claim 22 wherein the still facial photographic portrait of the person is surrounded by a special effect soft circle wipe.

24. A personalized custom video recording of a prescribed length featuring a person, utilizing a selected number of still photographic images of the person, produced by the process comprising the steps of:
- recording a series of personal images onto a first video storage medium in a selected recorded sequence from the selected number of still photographic images in which the personal images occupy adjacent frame segments of preselected lengths;
- recording scenic images onto a second video storage medium in a selected recorded sequence in which the scenic images occupy frame segments of preselected lengths;
- subsequently to the recording of the personal images, placing the first video storage medium in a first video recording player;
- placing the second video storage medium in a second video recording player;
- placing a master custom video storage medium in a third recording player;
- placing a prerecorded musical storage medium having selected music thereon in a music recording player;
- operating the recording players continuously and without interruption and in synchronization with each other for the prescribed length to produce the personal custom video recording of the prescribed recording length on the third video storage medium having the personal images, the scenic images, and the selected music recorded thereon in real time in which the personal images and the scenic images are interlaced with respect to each other and with the personal images and the scenic images being in their prescribed sequences; and
- wherein the continuous operation of the recording players are synchronized with respect to each other so that the adjacent frame segments of the personal images on the first recording medium are time shifted with respect to the adjacent frame time segments of the scenic images on the second recording medium as the personal custom video recording is being produced on the third video storage medium so that the frame segments of the personal images and the scenic images are not time coherent.

25. The personal custom video recording as defined in claim 24 wherein the production of the personal custom video recording includes the steps of switching between the first video recording player and the second video recording player and controlling the switching according to a preset sequential switching program to interleave the scenic images with the personal images in the selected recording sequences while the recording players are being continuously operated without interruption.

26. The personal custom video recording as defined in claim 25 wherein the scenic images are interleaved with the personal images according to the preselected time sequential program.

27. The personal custom video recording as defined in claim 26 wherein a majority of the interleaved scenic images have time lengths less than the adjacent personal images recorded thereon.

28. The personal custom video recording as defined in claim 26 wherein the recording has a progressively dissolve between the majority of the interleaved scenic images and the personal images of between two and six seconds.

29. The personal custom video recording as defined in claim 24 wherein the scenic images are interleaved with respect to the personal images in accordance with a preselected time sequential program while the recording players are being continuously operated without interruption.

30. The personal custom video recording as defined in claim 29 wherein the interleaved scenic images are personal images dissolve between each other according to the preselected time sequential program.

31. The personal custom video recording as defined in claim 30 wherein a majority of the interleaved scenic images have time lengths less than the personal images recorded on the master video recording.

32. The personal custom video recording as defined in claim 30 where the images progressively dissolve between the first recording player and the second recording player in a period of between two and six seconds.

33. The personal custom video recording as defined in claim 24 wherein the process of recording of the personal images includes the steps of sequentially placing the still photographic images before a video camera and operating the video camera to record personal images onto the first video storage medium with the personal images occupying adjacent segments in the selected recorded sequence.

34. The personal custom video recording as defined in claim 33 wherein the process further comprises the step of operating a zoom feature of the video camera or moving the camera with respect to the still photographic images or both to give a majority of the personal images recorded on the first video storage medium the visual appearance of the person moving.

35. The personal custom video recording as defined in claim 33 wherein at least one of the still photographic images includes a group of persons in which the featured person is included and wherein the video camera is operated to record frames including the group of persons as well as frames of close-ups of the featured person within the same segment.

36. The personal custom video recording as defined in claim 24 wherein the recording of the scenic images on the second video storage medium comprises sequentially directing a video camera at the scenic images in the preselected recorded sequence and operating the video camera to enlarge or contract the apparent size of objects with a majority of the scenic images to give such majority of scenic images the visual appearance of motion.

37. The personal custom video recording as defined in claim 24 wherein at least one of the scenic images includes moving objects within the scenic image.

38. The personal custom video recording as defined in claim 24 having a title segment at a forward end of the master custom video recording that includes the name of the featured person.

39. The personal custom video recording as defined in claim 38 wherein the title segment additionally includes the date of birth of the person.

40. The personal custom video recording as defined in claim 24 wherein the music includes a vocal segment prerecorded on the audio storage medium.

41. A personal custom video recording of a prescribed length of a featured person utilizing a preselected number of still photographic images of the person, in which the recording is produced in accordance with the process comprising the steps of:
recording personal images from the still photographic images onto a first video storage medium in a selected recorded sequence in which the personal images occupy adjacent frame segments of preselected lengths;
recording scenic images onto a second video storage medium in a selected recorded sequence in which the scenic images occupy adjacent frame segments of preselected lengths;
subsequently to the recording of the personal images, placing the first video storage medium in a first video recording player;
placing the second video storage medium in a second video recording player;
placing a master custom video storage medium in a third recording player;
placing a prerecorded musical storage medium having selected music thereon in a music recording player;
operating the recording players continuously and without interruption and in synchronization with each other for the prescribed recording length;
while operating the recording players continuously and without interruption, switching between the first video recording player and the second video recording player according to a prescribed sequential switching program and recording the personal images, the scenic images, and the selected music onto the master video recording in real time in which the personal images and the scenic images are interleaved with respect to each other and with the personal images and the scenic images being in their prescribed sequences; and
wherein the continuous operation of the recording players are synchronized with respect to each other so that the adjacent frame segments of the personal images on the first recording medium are time staggered with respect to the adjacent frame time segments of the scenic images on the second recording medium as the custom video recording is being produced so that the frame segments of the personal images and the scenic images are not time coherent.

42. The personal custom video recording as defined in claim 41 wherein the master video storage medium is a video magnetic tape having normal audio tracks and a video and high fidelity sound track and wherein the music is recorded on the video and high dynamic sound track, rather than the normal audio tracks of the master video magnetic tape.

43. The personal custom video recording as defined in claim 41 wherein the first scenic image recorded on the master video storage medium includes an image of a sunrise.

44. The personal custom video recording as defined in claim 41 wherein the last scenic image recorded on the master video storage medium includes an image of a sunset.

45. The personal custom video recording as defined in claim 41 wherein the first photographic image recorded on the master video storage medium includes a still facial photographic portrait of the person.

46. The personal custom video recording as defined in claim 45 wherein the still facial photographic portrait of the person is surrounded by a special effects soft circle wipe.

47. Custom video recording apparatus for producing a personal custom video recording of a prescribed length of a featured person utilizing a preselected number of still photographic images of the person, comprising:

- a first video recording means for recording personal images from the still photographic images onto a first video storage medium in a selected recorded sequence with the personal images occupying adjacent frame segments of preselected lengths;
- a second video recording means for recording scenic images onto a second video storage medium in a selected recorded sequence with the scenic images occupying adjacent frame segments of preselected lengths;
- a first video recording player for receiving the first video storage medium subsequent to the reading of the personal images on the first video storage medium;
- a second video recording player for receiving the second video storage medium;
- a third video recording player for receiving a master video storage medium;
- an audio recording player for receiving a prerecorded musical storage medium having selected music thereon;
- synchronization means operatively connected to the recording players for playing the recording players, continuously and without interruption and in synchronization with each other for the prescribed recording length; and
- switching and recording means responsive to a prescribed sequential switching program for switching between the first video recording player and the second video recording player according to the prescribed sequential switching program and recording the personal images, the scenic images, and the selected music onto the master video recording in real time with the playing of the recording players in which the personal images and the scenic images are interleaved with respect to each other and with the personal images and the scenic images being in their prescribed sequences; and
- wherein the synchronize means, continuously and without interruption plays the recording players in synchronization with respect to each other so that the adjacent frame segments of the personal images on the first recording medium are time phase shifted with respect to the adjacent frame time segments of the scenic images on the second recording medium as the custom video recording is being produced so that the frame segments of the personal images and the scenic images are not time coherent.

48. The custom video recording apparatus as defined in claim 47 wherein the master video storage medium is a video magnetic tape having normal audio tracks and a video and high fidelity sound track and wherein the switching and recording means records the music on the video and high dynamic sound track, rather than the normal audio tracks of the master video magnetic tape.

* * * * *